US009060041B2

(12) United States Patent
Egan et al.

(10) Patent No.: US 9,060,041 B2
(45) Date of Patent: Jun. 16, 2015

(54) RELAYING MESSAGES IN A HETEROGENEOUS NETWORK

(71) Applicant: MARVELL WORLD TRADE LTD., St. Michael (BB)

(72) Inventors: John Egan, Palm Harbor, FL (US); Marcos Martinez Vazquez, Barcelona (ES); Agustin Badenes Corella, Valencia (ES)

(73) Assignee: Marvell World Trade Ltd., St. Michael (BB)

( * ) Notice: Subject to any disclaimer, the term of this patent is extended or adjusted under 35 U.S.C. 154(b) by 90 days.

(21) Appl. No.: 13/909,852

(22) Filed: Jun. 4, 2013

(65) Prior Publication Data

US 2013/0325965 A1 Dec. 5, 2013

Related U.S. Application Data

(60) Provisional application No. 61/655,319, filed on Jun. 4, 2012.

(51) Int. Cl.
*G06F 15/16* (2006.01)
*H04L 29/06* (2006.01)
*H04L 12/28* (2006.01)

(52) U.S. Cl.
CPC ............ *H04L 65/403* (2013.01); *H04L 12/283* (2013.01); *H04L 12/2838* (2013.01)

(58) Field of Classification Search
USPC .................................................. 709/204, 223
See application file for complete search history.

(56) References Cited

U.S. PATENT DOCUMENTS

2005/0251604 A1* 11/2005 Gerig ............................ 710/120
2009/0196163 A1* 8/2009 Du ................................ 370/204

OTHER PUBLICATIONS

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jun. 2012.
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Oct. 2012.

(Continued)

*Primary Examiner* — Tammy Nguyen

(57) ABSTRACT

A message is received at a communication interface device coupled to a first media type. A second layer (e.g., a dynamic link layer (DLL)) on the communication interface device communicates with an abstraction layer (AL) regarding relaying of the message. The AL determines whether another communication interface device should relay the message via a second media type. When the AL determines that another communication interface device cannot or should not relay the message, the communication interface device relays the message using relaying functionality provided by the second layer (e.g., the DLL). When the AL determines that another communication interface device should relay the message, the AL forwards the message to the other the communication interface device for relaying via the second media type.

22 Claims, 7 Drawing Sheets

(56) References Cited

OTHER PUBLICATIONS

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2013.
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jul. 2013.
International Search Report and Written Opinion in corresponding application No. PCT/US2013/044127 mailed Aug. 23, 2013.
P1905.1/D05 Draft Standard for a Convergent Digital Home Network for Heterogeneous Technologies, IEEE P1905.1/D05, May 5, 2012.
ITU-T Draft OIS: G.hn: Outgoing Liaison to IEEE Nescom, Study Group 15, TD445 (WP1/15) Geneva, Switzerland, Feb. 14-25, 2011.
IEEE P1905.1™/D09, P1905.1TM/D0809 Draft Standard for a Convergent Digital Home Network for Heterogeneous Technologies, *The Institute of Electrical and Electronics Engineers, Inc.*, Dec. 13, 2012.
IEEE P1905.1™-2013, IEEE Draft Standard for a Convergent Digital Home Network for Heterogeneous Technologies, *The Institute of Electrical and Electronics Engineers, Inc.*, Mar. 6, 2013.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, 23 pages, Nov. 7, 2001.
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.
IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
van Nee, et al. "The 802.11n MIMO-OFDM Standard for Wireless LAN and Beyond," Wireless Personal Communications, vol. 37, pp. 445-453 (Jun. 2006).
Stacey et al., "IEEE P802.11, Wireless LANs, Proposed TGac Draft Amendment," Institute of Electrical and Electronics Engineers, doc. No. IEEE 802.11-10/1361r3 (Jan. 2011).
Stacey et al., "Specification Framework for TGac," document No. IEEE 802.11-09/0992r20, *Institute for Electrical and Electronics Engineers*, pp. 1-49, Jan. 18, 2011.
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," *The Institute of Electrical and Electronics Engineers, Inc.*, Mar. 2012.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

IEEE Std 802.11v™/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, (Aug. 2010).

IEEE Std 802.3-2002, "IEEE Standard for Information technology—Telecommunications and information exchange between systems—Local and metropolitan area networks—Specific.requirements, Part 3: Carrier sense multiple access with collision detection (CSMA/CD) access method and physical layer specifications," *The Institute of Electrical and Electronics Engineers, Inc.*, Mar. 8, 2002.

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, , Sections 1-5, Dec. 9, 2005.

IEEE Draft P802.3ae/D5.0 "Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation," *The Institute of Electrical and Electronics Engineers, Inc.*, May 1, 2002.

International Preliminary Report on Patentability in International Application No. PCT/US2013/044127, dated Dec. 9, 2014 (8 pages).

\* cited by examiner

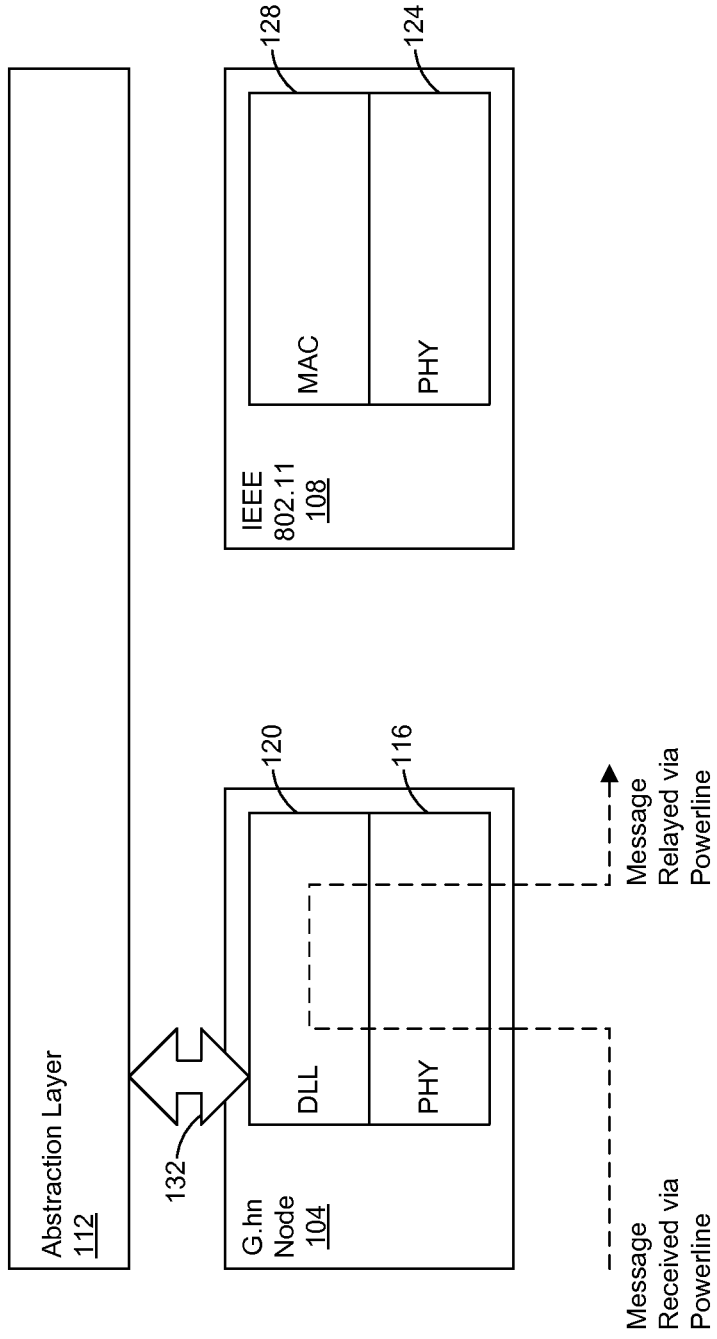

RELAYING MESSAGES IN A HETEROGENEOUS NETWORK

CROSS-REFERENCE TO RELATED APPLICATION

This disclosure claims the benefit of U.S. Provisional Patent Application No. 61/655,319, filed Jun. 4, 2012, entitled "Means of Enabling G.hn Nodes (Transceivers) to Support Relaying According to the G.hn Standards and be Able to Comply with IEEE 1905.1," the disclosure of which is hereby expressly incorporated herein by reference in its entirety.

FIELD OF TECHNOLOGY

The present disclosure relates generally to communication networks, and more particularly, to a communication network configured to operate using multiple heterogeneous communication technologies.

DESCRIPTION OF THE RELATED ART

Communication networks, such as home communication networks created in consumer homes or industrial communication networks in the workplace, are continually evolving. New ways of transmitting data, using various communication media, have been developed and are often employed simultaneously in such networks. For example, wireless communication channels are utilized for delivery of data to wireless devices, such as cell phones or tablets, while power lines are utilized for delivery of data to devices connected to power outlets, such as televisions or gaming systems in the home. In some instances, multiple communication technologies are employed within a single communication device, for example to increase link reliability in the communication device and/or to increase throughput rates of data delivery to the communication devices within the network. For example, a communication device connected to an internet router via a wireless connection and a powerline connection may be receiving internet content from the router via the wireless connection, but may be fully or partially switched to receiving the content via the powerline connection when the wireless link becomes unavailable or when capacity of the wireless link for transmission to the communication device diminishes.

Some standards, communication protocols and the like have been developed to help integrate devices that employ communication over disparate communication media into a heterogeneous network. For example, the recently approved Institute for Electrical and Electronics Engineers (IEEE) 1905.1 Standard aims to abstract heterogeneous media protocols from upper layer protocols in a communication device, and also simplifies integration of devices into a heterogeneous network by providing such functions as automatic device discovery, link metrics, path selection and other network related functions for efficient communication between communication devices within the heterogeneous network.

The International Telecommunications Union Telecommunication Standardization Sector (ITU-T) Recommendations G.9960, and G.9961 specify communication protocols for networking over power lines, phone lines, coaxial cables, and plastic optical fibers. For example, the ITU-T Recommendations G.9960 and G.9961 define a physical layer (PHY) and a data link layer (DLL) in a protocol stack utilized by transceivers (referred to by the ITU-T Recommendations G.9960 and G.9961 as "nodes"). Additionally, the ITU-T Recommendations G.9960 and G.9961 provide support for automatic relaying between nodes. For instance, when a first node cannot directly communication with a second node, a third node may act as a relay that relays messages between the first node and the second node. As an example, when a domain master (DM) is not be able to communicate directly with a node that is remote from the DM, the DM requires another node to act as a proxy (proxy DMs) for the remote node. The proxy DM relays messages between the DM and the remote node. The relaying specified by the ITU-T Recommendations G.9960 and G.9961 is handled by the DLL and does not require any interaction with protocol layers above the DLL. Thus, layers above the DLL are unaware of the forwarding carried out by the DLL.

SUMMARY OF THE DISCLOSURE

In one embodiment, a method is for processing messages in a heterogeneous network, the heterogeneous network including a plurality of disparate communication media types. The method includes receiving, at a first communication interface device of a first communication device, a message addressed to a second communication device. The first communication interface device is configured to communicate over a first communication media type according to (i) a first layer in a protocol stack of a communication protocol, and (ii) a second layer in the protocol stack, and the first communication interface device is configured to relay messages between two or more other communication devices in the heterogeneous network (i) via the first communication media type, and (ii) using relaying functionality specified by the second layer of the communication protocol. The method also includes communicating, using the first communication interface device, between the second layer of the communication protocol and an abstraction layer (AL) regarding relaying of the message, wherein the AL is configured to abstract the first layer and the second layer from an upper layer in the protocol stack. The method additionally includes at least one of: (i) if the AL rejects the message, relaying, with the first communication device, the message via the first communication media type using the relaying functionality specified by the second layer of the communication protocol, or (ii) when the AL instructs the second layer to relay the message, relaying, with the first communication device, the message via the first communication media type using the relaying functionality specified by the second layer of the communication protocol.

In various other embodiments, the method includes any combination of one or more of the following features.

The method further includes forwarding, with the first communication interface device, the message to the AL.

Forwarding the message to the AL is so that the message is relayed to the second communication device via a second communication interface device configured to communicate via a second communication media type if the AL does not instruct the second layer to relay the message.

The first layer and the second layer in the protocol stack correspond to (i) International Telecommunications Union Telecommunication Standardization Sector (ITU-T) Recommendation G.9960, and (ii) ITU-T Recommendation G.9961, respectively.

The first communication media type is one of (i) power line, (ii) coaxial cable, (iii) plastic optical fiber, or (iii) copper pair cabling.

In another embodiment, an apparatus is for communicating in a heterogeneous network, the heterogeneous network including plurality of disparate communication media types. The apparatus comprises a first communication interface configured to communicate over a first communication media type according to (i) a first layer in a protocol stack of a communication protocol, and (ii) a second layer in the protocol stack, relay messages between two or more other communication devices in the heterogeneous network (i) via the first communication media type, and (ii) using relaying functionality specified by the second layer of the communication protocol, communicate between the second layer of the communication protocol and an abstraction layer (AL) regarding relaying of the message, wherein the AL is configured to abstract the first layer and the second layer from an upper layer in the protocol stack. Additionally, the first communication interface is configured to, at least one of: (i) if the AL rejects the message, relay the message via the first communication media type using the relaying functionality specified by the second layer of the communication protocol, or (ii) when the AL instructs the second layer to relay the message, relay the message via the first communication media type using the relaying functionality specified by the second layer of the communication protocol.

In various other embodiments, the apparatus includes any combination of one or more of the following features.

The first communication interface is configured to forward the message to the AL.

The first communication interface is configured to forward the message to the AL is so that the message is relayed to the second communication device via a second communication interface device configured to communicate via a second communication media type if the AL does not instruct the second layer to relay the message.

The first communication interface is configured to implement the first layer and the second layer in the protocol stack according to (i) International Telecommunications Union Telecommunication Standardization Sector (ITU-T) Recommendation G.9960, and (ii) ITU-T Recommendation G.9961, respectively.

The first communication media type is one of (i) power line, (ii) coaxial cable, (iii) plastic optical fiber, or (iii) copper pair cabling.

In yet another embodiment, a method is for processing messages in a heterogeneous network, the heterogeneous network including a plurality of disparate communication media types, wherein a protocol stack of a communication protocol is associated with a first communication media type, wherein the protocol stack includes (i) a first layer, and (ii) a second layer. The method includes communicating, using a processor of a first communication device, between an abstraction layer (AL) and the second layer of the communication protocol regarding relaying of a message received at a first communication interface device of the first communication device, wherein the message is addressed to a second communication device, the first communication interface device is configured to relay messages between two or more communication devices in the heterogeneous network (i) via the first communication media type, and (ii) using relaying functionality specified by the second layer of the communication protocol, and the AL is configured to abstract the first layer and the second layer from an upper layer in the protocol stack. The method also includes determining at the AL, using the processor, whether the message should be relayed by another communication interface associated with another media type. The method additionally includes at least one of: (i) when the AL determines that the message should be relayed by another communication interface associated with another media type, forwarding from the AL, using the processor, the message to a second communication interface device associated with a second communication media type, and (ii) wherein, when the AL determines that the message should be relayed by the first communication interface device, communicating between the AL and the second layer of the communication protocol regarding relaying of the message includes at least one of: (a) communicating to the second layer, using the processor, a rejection by the AL of the message, or (b) instructing the second layer, using the processor, to relay the message using the relaying functionality specified by the second layer.

In various other embodiments, the method includes any combination of one or more of the following features.

Determining at the AL whether the message should be relayed by another communication interface associated with another media type comprises determining at the AL, using the processor, whether the message can be relayed by another communication interface associated with another media type.

The method further comprises receiving at the AL, using the processor, the message from the second layer.

The first layer and the second layer in the protocol stack correspond to (i) International Telecommunications Union Telecommunication Standardization Sector (ITU-T) Recommendation G.9960, and (ii) ITU-T Recommendation G.9961, respectively.

The first communication media type is one of (i) power line, (ii) coaxial cable, (iii) plastic optical fiber, or (iii) copper pair cabling.

In still another embodiment, an apparatus is for processing messages in a heterogeneous network, the heterogeneous network including a plurality of disparate communication media types, wherein a protocol stack of a communication protocol is associated with a first communication media type, wherein the protocol stack includes (i) a first layer, and (ii) a second layer. The apparatus comprises a processor configured to implement an abstraction layer (AL), communicate between the abstraction layer (AL) and the second layer of the communication protocol regarding relaying of a message received at a first communication interface device of a first communication device, wherein the message is addressed to a second communication device, the first communication interface device is configured to relay messages between two or more other communication devices in the heterogeneous network (i) via the first communication media type, and (ii) using relaying functionality specified by the second layer of the communication protocol, and the AL is configured to abstract the first layer and the second layer from an upper layer in the protocol stack. The processor is further configured to determine, at the AL, whether the message should be relayed by another communication interface associated with another media type; and at least one of: (i) when the AL determines that the message should be relayed by another communication interface associated with another media type, forward from the AL the message to a second communication interface device associated with a second communication media type, and (ii) wherein, when the AL determines that the message should be relayed by the first communication interface device, communicating between the AL and the second layer of the communication protocol regarding relaying of the message includes at least one of: (a) communicating to the second layer a rejection by the AL of the message, or (b) instructing the second layer to relay the message using the relaying functionality specified by the second layer.

In various other embodiments, the apparatus includes any combination of one or more of the following features.

The processor is configured to determine at the AL whether the message can be relayed by another communication interface associated with another media type.

The processor is configured to receive, at the AL, the message from the second layer.

The first communication interface device is configured to implement the first layer and the second layer in the protocol stack according to (i) International Telecommunications Union Telecommunication Standardization Sector (ITU-T) Recommendation G.9960, and (ii) ITU-T Recommendation G.9961, respectively.

The apparatus further comprises the first communication interface device.

The apparatus further comprises a second communication interface device coupled to a second media type.

The first communication media type is one of (i) power line, (ii) coaxial cable, (iii) plastic optical fiber, or (iii) copper pair cabling.

BRIEF DESCRIPTION OF THE DRAWINGS

FIGS. 2A-2C are diagrams illustrating example operations of a communication device having a first communication interface device that is configured to communicate via a powerline medium, and a second communication interface device 108 that is configured to communicate via a wireless medium, according to various embodiments and/or scenarios.

DETAILED DESCRIPTION

Figure 1:
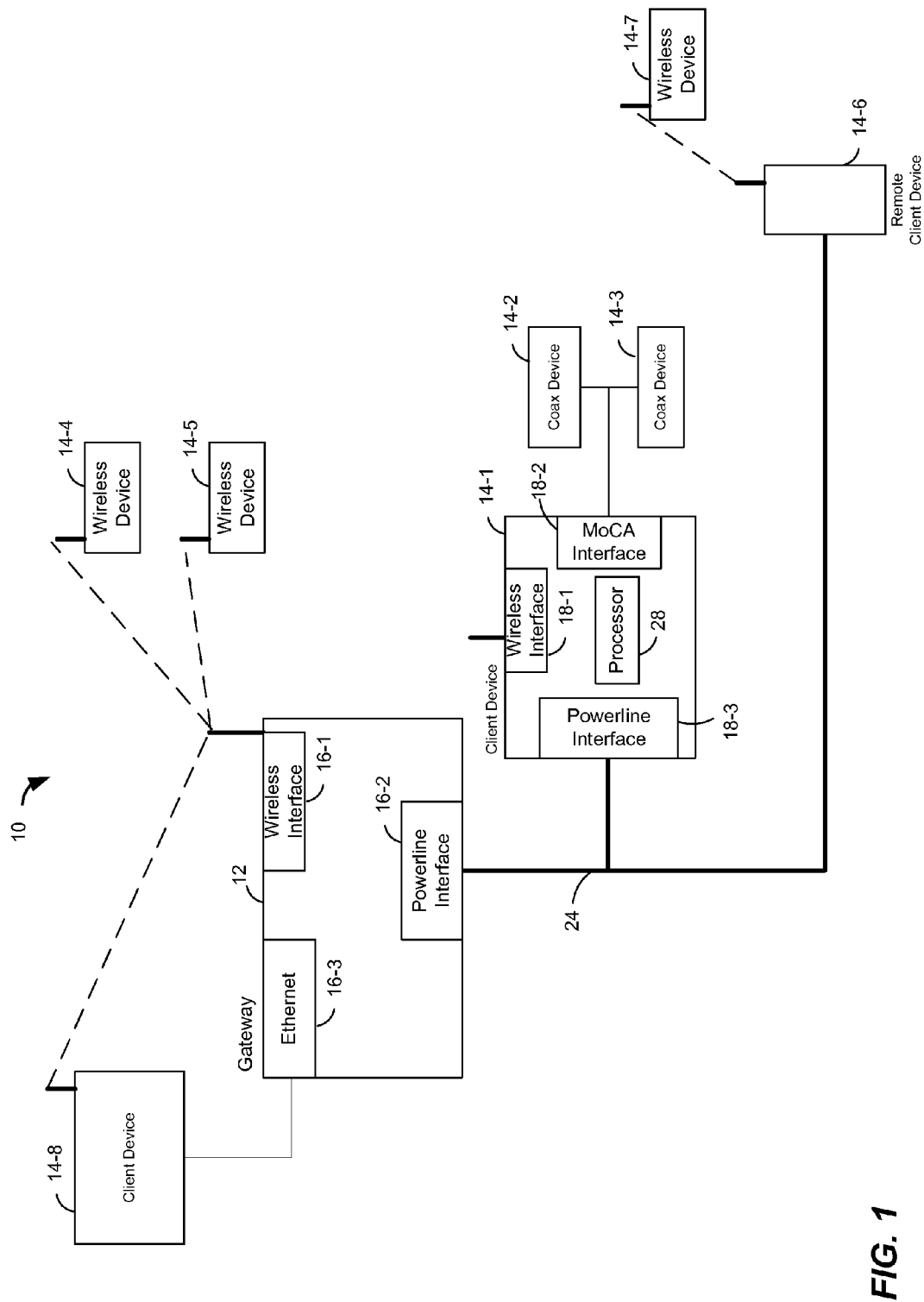
FIG. 1 is a diagram of an example heterogeneous communication network, according to an embodiment.

FIG. 1 is a diagram of an example heterogeneous communication network 10, according to an embodiment. The network 10 is a home network that connects various communication devices (e.g., cellular phones, tablets, laptops, personal computers (PCs), set-top boxes, televisions (TVs), gaming systems, etc.) within the home, in an embodiment. In other embodiments, the communication network 10 connects various communication devices in other settings, such as in the workplace, for example. In an embodiment, the network 10 is a "convergent network" in which one or more communication devices communicate using several different communication technologies for communicating via disparate communication media. The network 10 includes a gateway device 12 and a plurality of client devices 14 configured to communicate with the gateway device 12 and/or with other client devices 14 over the network 10. The gateway 12 includes a plurality of communication interface devices 16, and each of the communication interface devices 16 is configured to communicate with the client devices 14 (e.g., to transmit data such as Internet content, video streaming content, audio streaming content, email, etc., to the client devices 14) via a respective communication media over the network 10. In the example embodiment of FIG. 1, the gateway 12 includes a first interface device 16-1 configured to communicate over wireless communication media (e.g., according to a Wi-Fi communication protocol), a second interface device 16-2 configured to communicate over power line communication media (e.g., according to a communication protocol specified by the ITU-T Recommendations G.9960 and G.9961), and a third communication interface device 16-3 configured for wired Ethernet communication (e.g., according to an Ethernet communication protocol). Although the gateway 12 is illustrated in FIG. 1 as having three communication interface devices 16, the gateway 12 includes other numbers of interface devices (e.g., 1, 2, 4, 5, etc.), in other embodiments. Further, communication interface devices included in the gateway 16 are configured to communicate using any suitable communication media, including but not limited to Ethernet, wireless (e.g., Wi-Fi, WiMAX, LTE, etc.), broadband over powerline, media over coaxial cable, other suitable wireless or wired communication media, etc.

Each of the client devices 14 includes one or more communication interface devices for communicating with the gateway 12 (e.g., for receiving content data from the gateway 12) and/or with the other client devices 14 within the network 10 using one or more communication media types. For example, the client device 14-1 includes a first communication interface device 18-1 configured to communicate over wireless communication media (e.g., according to a Wi-Fi communication protocol), a second communication interface device 18-2 configured to communicate over a multimedia over coax cable communication media (e.g., according to a multimedia over coax alliance (MoCA) communication protocol), and a third communication interface 18-3 configured for broadband over powerline communication. Although the client device 14-1 is illustrated in FIG. 1 as having three communication interface devices 18, the client device 14-1 includes other suitable numbers of interfaces (e.g., 1, 2, 4, 5, etc.), in other embodiments. Further, communication interface devices included in the client device 14-1 are configured to communicate using any suitable communication media, including but not limited to Ethernet, wireless (e.g., Wi-Fi, WiMAX, etc.), broadband over powerline, media over coax, other suitable wireless or wired communication media, etc.

In an embodiment, one or all of the client devices 14-2-14-8, have a structure the same as or similar to the client device 14-1. In these embodiments, the client devices 14-2-14-8 structured the same as or similar to the client device 14-1 have the same or a different number of communication interface devices as the client device 14-1. For example, each of the client devices 14-6 and 14-8 is a dual-interface device having two communication interface devices, each of client devices 14-4, 14-5, and 14-7 is a wireless device having only a wireless communication interface device, each of the client devices 14-2 and 14-3 is a coaxial line communication device having only a coaxial line communication interface device. Further, although the communication network 10 is illustrated in FIG. 1 as including eight client devices 14-1-14-8, the communication network 10 includes other suitable numbers (e.g., 1, 2, 3, 4, 5, 6, 7, 9, etc.) of client devices 14 in other embodiments.

According to an embodiment, the gateway 12 and one or more of the client devices 14 are configured to operate according to a convergent network communication protocol that defines an abstraction of operation of different communication technologies from upper protocol layers within the gateway 12 and the one or more client devices 14. For example, in an embodiment, the gateway 12 and the one or more of the client device 14 are configured to operate according to the Institute for Electrical and Electronics Engineers (IEEE) 1905.1 Standard, or another suitable convergent network communication protocol. In some embodiments, the gateway 12 and the one or more of the client device 14 further rely on the convergent network communication protocol to simplify operation of the network 10. For example, the gateway 12 and the one or more of the client device 14 utilize the convergent network communication protocol to discover other devices within the network 10 that are configured to operate according to the convergent network communication protocol within the network 10, to determine types of connections that are available for communication with other the other devices within the network 10, to maintain link data for active links between devices in the network 10, to dynamically select appropriate or best links from transmission of data to devices in the network 10, etc.

Some client devices 14 may act as relays or proxies to facilitate communication between the gateway 12 and other client devices, for example. For instance, the device 14-6 is too remote from the gateway 12 to communicate directly with the gateway 12. Thus, in an embodiment, the client device 14-1 is configured to relay messages between the gateway 12 and the device 14-6. Similarly, the device 14-7 is too remote from the gateway 12 to communicate directly with the gateway 12. Thus, in an embodiment, the client device 14-1 is configured to relay messages between the gateway 12 and the device 14-7 by relaying the message to the device 14-6, which in turn relays the message to the device 14-7.

In an embodiment, the interface device 16-2, the interface device 18-3, and a powerline interface device (not shown) in the client device 14-6 are configured to operated according to the communication protocol specified by the ITU-T Recommendations G.9960 and G.9961 except for modifications discussed herein. In an embodiment, the interface device 18-3 receives messages addressed to the client device 14-6 from the gateway 12 via a power line medium 24, and the interface device 18-3 is configured to relay such messages to the client device 14-6 using relaying functionality specified in the ITU-T Recommendations G.9960 and G.9961.

In some embodiments and/or scenarios, however, the client device 14-1 is also capable of relaying messages from the gateway 12 to the client device 14-6 via a wireless medium. For example, in an embodiment, the client device 14-1 is configured to receive messages addressed to the client device 14-6 from the gateway 12 via a power line medium 24, and to relay such messages to the client device 14-6 via the wireless interface 18-1 and via the wireless medium. The client device 14-6 includes a wireless communication interface device (not shown) configured to communicate with the client device 14-1 via the wireless communication interface 18-1, and to receive the relayed messages from the client device 14-1 via the wireless medium, in an embodiment.

In an embodiment, the client device 14-1 includes a processor 28 configured to implement an abstraction layer (AL) in the communication protocol stack. The AL is configured according to a convergent network communication protocol (e.g., similar to the IEEE 1905.1 Standard, but with differences regarding relaying of messages as discussed herein), according to an embodiment. Generally speaking, the AL abstracts operation of the disparate communication interfaces 18 from an upper protocol layer of the protocol stack used in the communication device 14-1, such as a logic link control layer (LLC). In an embodiment, the AL lies between the DLL and the LLC layer of the protocol stack used by communication device 14-1 and acts to abstract different communication technologies of the interfaces 18 from an upper protocol layer, such as the LLC layer, making the upper protocol layer agnostic to the specific communication protocols according to which the interfaces 18 operate.

In an embodiment, the AL (implemented by the processor 28) is configured to communicate with layers below the AL, implemented by the interface device 18-3, regarding relaying of messages received by the interface device 18-3. In an embodiment, the AL is configured to determine whether a message addressed to another device (e.g., the device 14-6) received via the interface device 18-3 (i) should be relayed using relaying functionality of layers, implemented by the interface device 18-3, below the AL, or (ii) should be relayed using another interface device (e.g., device 18-1). As an illustrative example, the AL may decide whether a message addressed to the client device 14-6 should be relayed (i) by the interface device 18-3 (using relaying functionality specified by the ITU-T Recommendations G.9960 and G.9961), or (ii) by the wireless interface device 18-1, in an embodiment.

The processor 28 is configured to execute machine readable instructions stored in a memory, where the machine readable instructions, when executed, implement at least some of the functionality of the AL, according to an embodiment. In other embodiments, the processor 28 additionally or alternatively includes hardware circuitry configured to implement at least some of the functionality of the AL. For example, in some embodiments, the processor 28 comprises an application specific integrated circuit (ASIC), a programmable logic device (PLD), a custom integrated circuit, etc., configured to implement at least some of the functionality of the AL.

FIG. 2A is a diagram illustrating an example operation of a communication device 100 having a first communication interface device 104 that is configured to communicate via a powerline medium, and second communication interface device 108 that is configured to communicate via a wireless medium, according to an embodiment. In an embodiment, the first communication interface device 104 is configured to operate according to the ITU-T Recommendations G.9960 and G.9961 (a "G.hn Node") except for modifications discussed herein, and the second communication interface device 108 is configured to operate according to one or more of the IEEE 802.11 Standards (e.g., IEEE 802.11a, 802.11g, 802.11n, 802.11ac, etc.). In other embodiments, the communication interface devices 104 and 108 are configured to communicate according to other suitable communication media and/or according one or more other suitable communication protocols.

In an embodiment, the communication device 100 implements an AL 112. In an embodiment, the AL 112 is implemented using a processor (e.g., processor 28 of FIG. 1). The processor implementing the AL 112 is configured to execute machine readable instructions stored in a memory, where the machine readable instructions, when executed, implement at least some of the functionality of the AL 112, according to an embodiment. In other embodiments, the processor additionally or alternatively includes hardware circuitry configured to implement at least some of the functionality of the AL 112. For example, in some embodiments, the processor implementing the AL 112 comprises an ASIC, a PLD, a custom integrated circuit, etc., configured to implement at least some of the functionality of the AL 112. The AL 112 is configured according to a convergent network communication protocol (e.g., similar to the IEEE 1905.1 Standard, but with differences regarding relaying of messages as discussed herein), according to an embodiment.

In an embodiment, the first communication interface device 104 implements a physical layer (PHY) 116 and a data link layer (DLL) 120. In an embodiment, the PHY 116 is at a lowest (first) layer in a protocol stack, and the DLL 120 is at a second layer above the PHY 116. The AL 112 is above the DLL 120 and is configured to abstract the PHY 116 and the DLL 120 from an upper layer (not shown) in the protocol stack, according to an embodiment. In an embodiment, the upper layer is a logic link control (LLC) layer, or another suitable layer.

In an embodiment, the second communication interface device 108 implements a PHY 124 and a media access control (MAC) layer 128. In an embodiment, the PHY 124 is at the lowest (first) layer in a protocol stack, and the MAC layer 128 is at a second layer above the PHY 124. The AL 112 is above the MAC layer 128 and is configured to abstract the PHY 124 and the MAC layer 128 from the upper layer (not shown) in the protocol stack, according to an embodiment.

When a message (not addressed to the device 100) is received by the G.hn node 104, the message is processed by the PHY 116 and the DLL 120, in an embodiment. The DLL 120 communicates with AL 112 regarding relaying of the message, in an embodiment. For example, the DLL 120 exchanges one or more control messages 132 with the AL 112, in an embodiment. In an embodiment, the DLL 120 notifies the AL 112 that the DLL 120 received the message, which is addressed to another device. In an embodiment, the AL 112 determines whether the message should be relayed by another communication interface (e.g., interface 108) associated with another media type.

In the example scenario illustrated in FIG. 2A, the AL 112, rejects the message. For example, in an embodiment, the AL 112 determines that another communication interface (e.g., the interface device 108) of the device 100 cannot relay the message, and thus rejects the message. As illustrative examples, in various embodiments and/or scenarios, the AL 112 determines that no other communication interface of the device 100 is available to relay the message, that no other communication interface of the device 100 is capable of relaying the message to the device addressed in the message, etc. Determining that no other communication interface of the device 100 is capable of relaying the message to the device addressed in the message comprises analyzing a destination address in the message (communicated to the AL 112 by the DLL 120) and determining that no other communication interface of the device 100 is capable of relaying the message to the addressed device, in an embodiment.

In response to the rejection, the G.hn node 104 relays the message using relaying functionality implemented by the DLL 120, according to an embodiment. For example, the DLL 120 utilizes relaying functionality specified by the ITU-T Recommendation G.9961, in an embodiment.

Figure 2B:
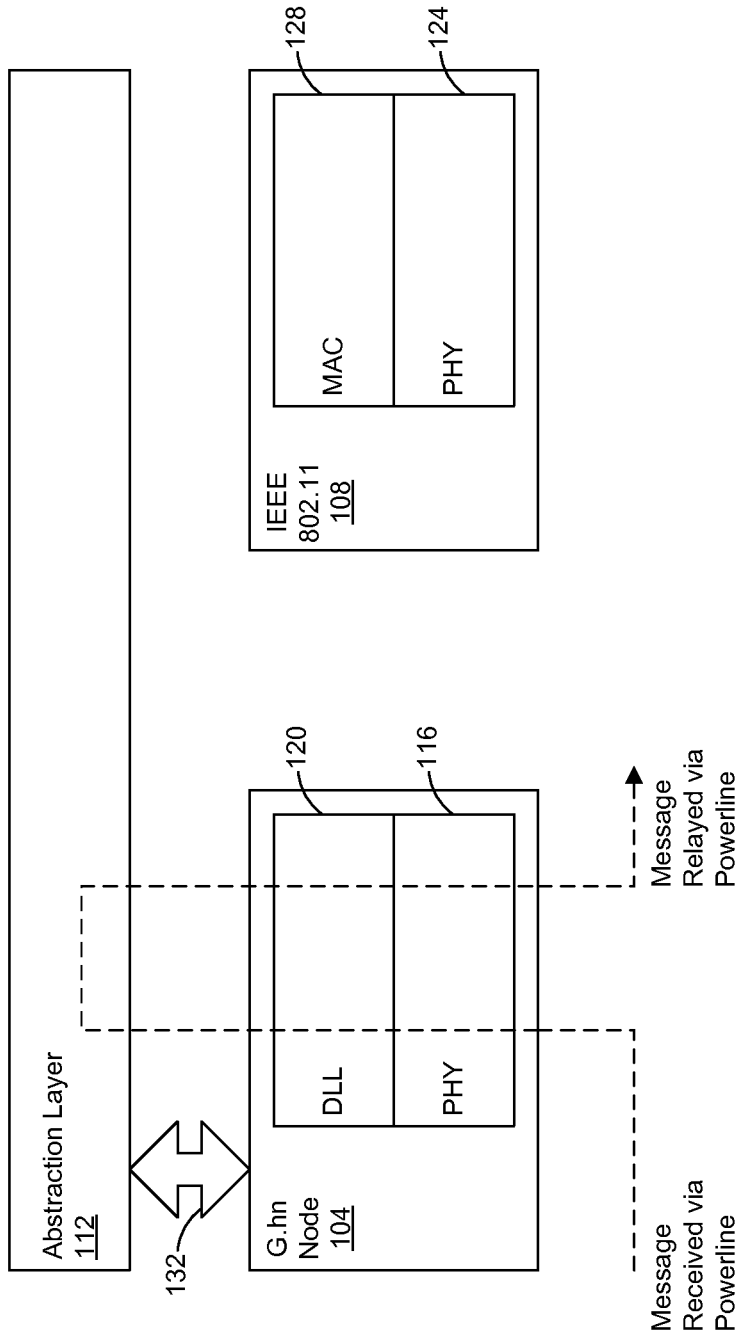

FIG. 2B is a diagram illustrating another example operation of the communication device 100, according to another embodiment and/or another scenario.

When the message (not addressed to the device 100) is received by the G.hn node 104, the message is processed by the PHY 116 and the DLL 120, in an embodiment. The DLL 120 communicates with AL 112 regarding relaying of the message, in an embodiment. For example, the DLL 120 exchanges one or more control messages 132 with the AL 112, in an embodiment. In an embodiment, the DLL 120 notifies the AL 112 that the DLL 120 received the message, which is addressed to another device. In an embodiment, the AL 112 determines whether the message should be relayed by another communication interface (e.g., interface 108) associated with another media type.

In the example scenario illustrated in FIG. 2B, the DLL 120 passes the message to the AL 112 and the AL 112 determines which communication interface device in the device 100 should relay the message. For example, in an embodiment, the AL 112 determines which communication interface device (e.g., the interface device 104 or the interface device 108) of the device 100 can better relay the message. As illustrative examples, in various embodiments and/or scenarios, the AL 112 communicates with the interface device 104 and the interface device 108 to determine one or more of current processing loads, throughput rates, latencies, signal to noise ratios, error rates, etc., associated with the different communication interfaces 104, 108, and chooses one of the communication interfaces based on one or more of current processing loads, throughput rates, latencies, signal to noise ratios, error rates, etc., in various embodiments.

In the example scenario illustrated in FIG. 2B, the AL 112 passes the message back to the DLL 120 of the interface device 104 and instructs the DLL 120 to relay the message. In response, the G.hn node 104 uses relaying functionality implemented by the DLL 120 to relay the message, according to an embodiment. For example, the DLL 120 utilizes relaying functionality specified by the ITU-T Recommendation G.9961, in an embodiment.

Figure 2C:
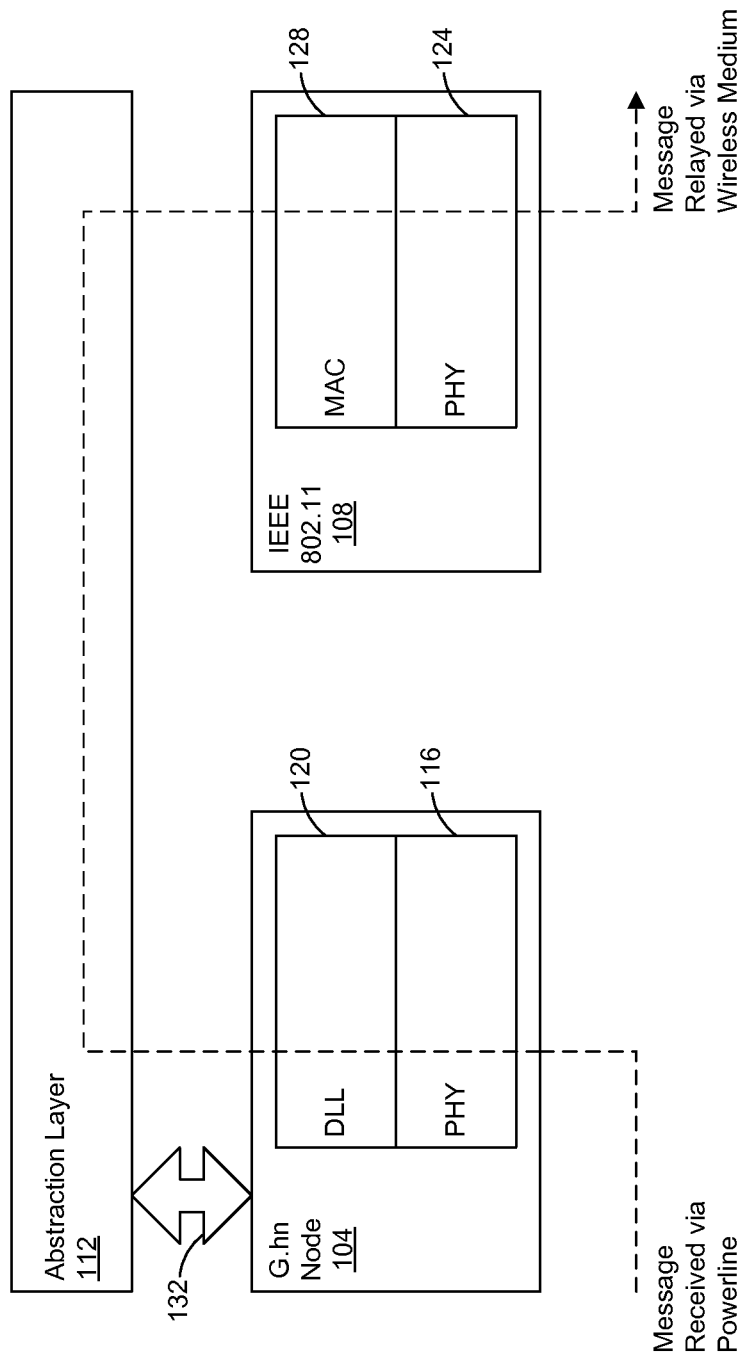

FIG. 2C is a diagram illustrating another example operation of the communication device 100, according to another embodiment and/or another scenario.

When the message (not addressed to the device 100) is received by the G.hn node 104, the message is processed by the PHY 116 and the DLL 120, in an embodiment. The DLL 120 communicates with the AL 112 regarding relaying of the message, in an embodiment. For example, the DLL 120 exchanges one or more control messages 132 with the AL 112, in an embodiment. In an embodiment, the DLL 120 notifies the AL 112 that the DLL 120 received the message, which is addressed to another device. In an embodiment, the AL 112 determines whether the message should be relayed by another communication interface (e.g., interface 108) associated with another media type.

In the example scenario illustrated in FIG. 2C, the DLL 120 passes the message to the AL 112 and the AL 112 determines which communication interface device in the device 100 should relay the message. For example, in an embodiment, the AL 112 determines which communication interface device (e.g., the interface device 104 or the interface device 108) of the device 100 can better relay the message. As illustrative examples, in various embodiments and/or scenarios, the AL 112 communicates with the interface device 104 and the interface device 108 to determine one or more of current processing loads, throughput rates, latencies, signal to noise ratios, error rates, etc., associated with the different communication interfaces 104, 108, and chooses one of the communication interfaces based on one or more of current processing loads, throughput rates, latencies, signal to noise ratios, error rates, etc., in various embodiments. In other embodiments, other suitable criteria for selecting which communication interface device will relay the message are utilized.

In the example scenario illustrated in FIG. 2C, the AL 112 passes the message to the MAC layer 128 of the interface device 108 and instructs the MAC layer 128 to relay the message. In response, the interface device 108 relays the message via a wireless communication medium, according to an embodiment.

Although FIGS. 2A-2C were discussed in the context of the interface device 104 communicating over a powerline medium and the interface device 108 communication over a wireless medium for illustrative purposes, in other embodiments, the interface device 104 communicates over another suitable media type (e.g., coaxial cable, plastic optical fiber, copper pair cabling, etc.) and the interface device 108 communicates over another suitable media type (e.g., powerline, coaxial cable, plastic optical fiber, copper pair cabling, Ethernet, etc.).

Figure 3:
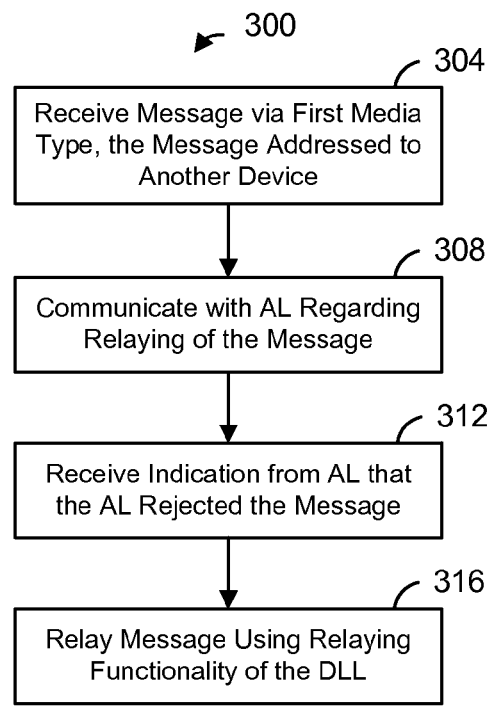
FIG. 3 is a flow diagram of an example method for relaying messages in a heterogeneous communication network, according to an embodiment.

FIG. 3 is a flow diagram of an example method 300 that is implemented by a first communication interface device that is configured to communicate over a first communication media type according to (i) a first layer in a protocol stack of a communication protocol, and (ii) a second layer in the protocol stack, in an embodiment. The first communication interface device is also configured to relay messages between two or more other communication devices in (i) via the first communication media type, and (ii) using relaying functionality specified by the second layer of the communication protocol, in an embodiment. In various embodiments, the method 300 is implemented by the communication interface device 18-3 (FIG. 1), the communication interface device 104 (FIGS. 2A-2C), or another suitable interface device. Merely for illustrative purposes, the method 300 is discussed (i) with reference to FIG. 2A, and (ii) in the context of the method 300 being implemented by the communication interface device 104.

At block 304, a message is received at the first communication interface device of the first communication device via a first media type, where the message is addressed to a device different than the first communication device. For example, the message is received at the first communication interface device 104 via a powerline medium. In other embodiments, the message is received via another suitable media type (e.g., coaxial cable, plastic optical fiber, copper pair cabling, etc.).

At block 308, the first communication interface device communicates with an AL implemented by a processor of the first communication device. For example, the DLL 120 communicates with the AL 112 regarding relaying of the message, in an embodiment. For example, the DLL 120 exchanges one or more control messages 132 with the AL 112, in an embodiment. In an embodiment, the DLL 120 notifies the AL 112 that the DLL 120 received the message, which is addressed to another device (e.g., a second communication device).

At block 312, the first communication interface device receives, from the AL, an indication that the AL rejects the message. For example, the DLL 120 receives, from the AL 112, an indication that the AL 112 rejects the message. In some embodiments, block 312 is included in block 308, and the indication that the AL rejects the message is one of the control messages 132 exchanged between the DLL 120 and the AL 112. In other embodiments, block 312 is separate from the block 308.

At block 316, the first communication interface device, responsive to the indication of the rejection received at block 312, relays the message via the first media type using relaying functionality implemented by the DLL 120, according to an embodiment. For example, the DLL 120 utilizes relaying functionality specified by the ITU-T Recommendation G.9961, in an embodiment.

Figure 4:
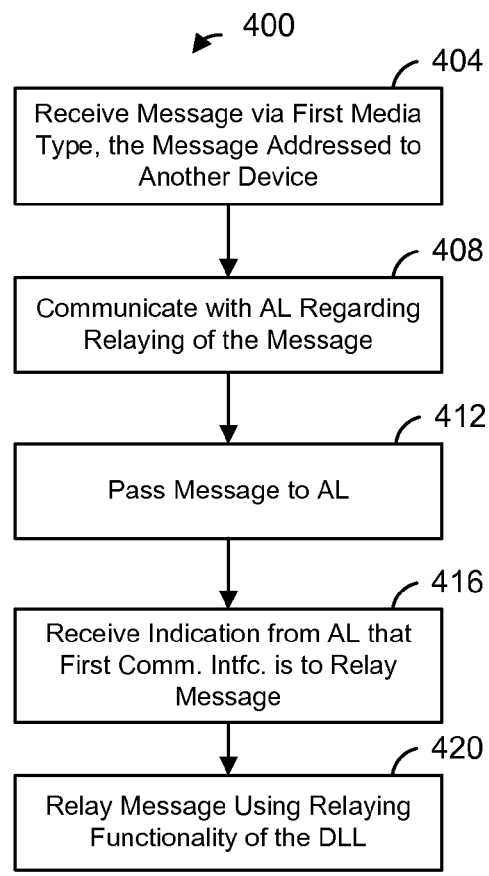
FIG. 4 is a flow diagram of another example method for relaying messages in a heterogeneous communication network, according to another embodiment.

FIG. 4 is a flow diagram of an example method 400 that is implemented by a first communication interface device that is configured to communicate over a first communication media type according to (i) a first layer in a protocol stack of a communication protocol, and (ii) a second layer in the protocol stack, in an embodiment. The first communication interface device is also configured to relay messages between two or more other communication devices in (i) via the first communication media type, and (ii) using relaying functionality specified by the second layer of the communication protocol, in an embodiment. In various embodiments, the method 400 is implemented by the communication interface device 18-3 (FIG. 1), the communication interface device 104 (FIGS. 2A-2C), or another suitable interface device. Merely for illustrative purposes, the method 400 is discussed (i) with reference to FIG. 2B, and (ii) in the context of the method 400 being implemented by the communication interface device 104.

At block 404, a message is received at the first communication interface device of the first communication device via a first media type, where the message is addressed to a device different than the first communication device. For example, the message is received at the first communication interface device 104 via a powerline medium. In other embodiments, the message is received via another suitable media type (e.g., coaxial cable, plastic optical fiber, copper pair cabling, etc.).

At block 408, the first communication interface device communicates with an AL implemented by a processor of the first communication device. For example, the DLL 120 communicates with the AL 112 regarding relaying of the message, in an embodiment. For example, the DLL 120 exchanges one or more control messages 132 with the AL 112, in an embodiment. In an embodiment, the DLL 120 notifies the AL 112 that the DLL 120 received the message, which is addressed to another device (e.g., a second communication device).

At block 412, the first communication interface device passes the message to the AL. For example, the DLL 120 passes the message to the AL 112, in an embodiment. In some embodiments, block 412 is included in block 408. In other embodiments, block 412 is separate from the block 408.

At block 416, the first communication interface device receives, from the AL, an indication that the first communication interface device is to relay the message. For example, the DLL 120 receives, from the AL 112, an indication that the first communication interface device is to relay the message. In some embodiments, block 416 is included in block 408, and the indication that the first communication interface device is to relay the message is one of the control messages 132 exchanged between the DLL 120 and the AL 112. In other embodiments, block 416 is separate from the block 408.

At block 420, the first communication interface device, responsive to the indication received at block 416, relays the message via the first media type using relaying functionality implemented by the DLL 120, according to an embodiment. For example, the DLL 120 utilizes relaying functionality specified by the ITU-T Recommendation G.9961, in an embodiment.

Figure 5:
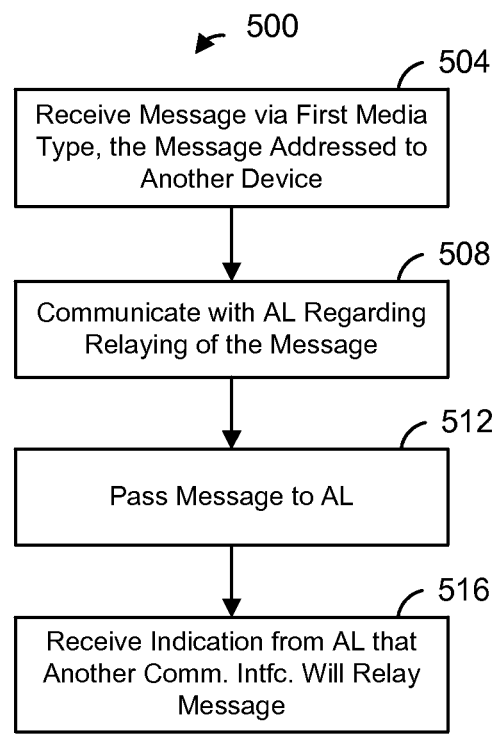
FIG. 5 is a flow diagram of another example method relaying messages in a heterogeneous communication network, according to an embodiment.

FIG. 5 is a flow diagram of an example method 500 that is implemented by a first communication interface device that is configured to communicate over a first communication media type according to (i) a first layer in a protocol stack of a communication protocol, and (ii) a second layer in the protocol stack, in an embodiment. The first communication interface device is also configured to relay messages between two or more other communication devices in (i) via the first communication media type, and (ii) using relaying functionality specified by the second layer of the communication protocol, in an embodiment. In various embodiments, the method 500 is implemented by the communication interface device 18-3 (FIG. 1), the communication interface device 104 (FIGS. 2A-2C), or another suitable interface device. Merely for illustrative purposes, the method 500 is discussed (i) with reference to FIG. 2C, and (ii) in the context of the method 500 being implemented by the communication interface device 104.

At block 504, a message is received at the first communication interface device of the first communication device via a first media type, where the message is addressed to a device different than the first communication device. For example, the message is received at the first communication interface device 104 via a powerline medium. In other embodiments, the message is received via another suitable media type (e.g., coaxial cable, plastic optical fiber, copper pair cabling, etc.).

At block 508, the first communication interface device communicates with an AL implemented by a processor of the first communication device. For example, the DLL 120 communicates with the AL 112 regarding relaying of the message, in an embodiment. For example, the DLL 120 exchanges one or more control messages 132 with the AL 112, in an embodiment. In an embodiment, the DLL 120 notifies the AL 112 that the DLL 120 received the message, which is addressed to another device (e.g., a second communication device).

At block 512, the first communication interface device passes the message to the AL. For example, the DLL 120 passes the message to the AL 112, in an embodiment. In some embodiments, block 512 is included in block 508. In other embodiments, block 512 is separate from the block 508.

At block 516, the first communication interface device receives, from the AL, an indication that another communication interface device (e.g., the communication interface device 108) will relay the message. For example, the DLL 120 receives, from the AL 112, an indication that another communication interface device will relay the message. In some embodiments, block 516 is included in block 508, and the indication that another communication interface device will relay the message is one of the control messages 132 exchanged between the DLL 120 and the AL 112. In other embodiments, block 516 is separate from the block 508. In some embodiments, block 516 is omitted.

Figure 6:
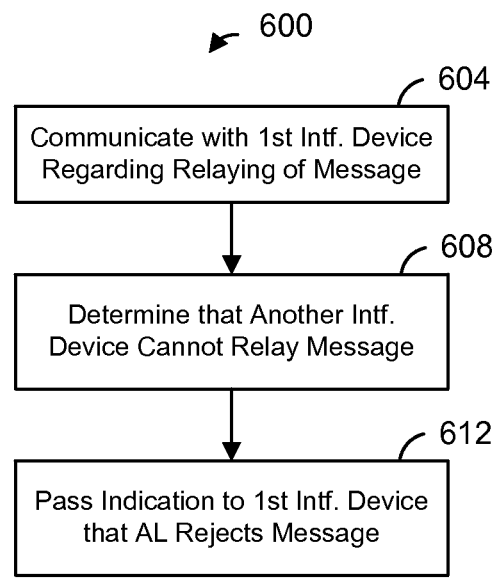
FIG. 6 is a flow diagram of an example method for processing messages in a heterogeneous communication network, according to an embodiment.

FIG. 6 is a flow diagram of an example method 600 that is implemented by a processor of a communication device, according to an embodiment. In various embodiments, the method 600 is implemented by the processor 28 (FIG. 1) or another suitable processor. Merely for illustrative purposes, the method 600 is discussed (i) with reference to FIG. 2A, and (ii) in the context of the method 600 being implemented by the processor 28. In an embodiment, the processor implements an AL, and the method 600 is discussed in the context of the AL 112 implementing the method 600 merely for illustrative purposes.

At block 604, the AL communicates with a first communication interface device of the first communication device regarding relaying a message received by the first communication interface device via a first communication media type. For example, the AL 112 communicates with the DLL 120 regarding relaying of the message received by the interface device 104 via the powerline media, in an embodiment. For example, the AL 112 exchanges one or more control messages 132 with the DLL 120, in an embodiment. In an embodiment, the DLL 120 notifies the AL 112 that the DLL 120 received the message, which is addressed to another device (e.g., a second communication device).

In an embodiment, the first communication interface device is configured to communicate over a first communication media type according to (i) a first layer (e.g., the PHY 116) in a protocol stack of a communication protocol, and (ii) a second layer (e.g., the DLL 120) in the protocol stack, in an embodiment. The first communication interface device is also configured to relay messages between two or more other communication devices in (i) via the first communication media type, and (ii) using relaying functionality specified by the second layer (e.g., the DLL 120) of the communication protocol, in an embodiment.

At block 608, the AL determines that the message cannot be relayed by another communication interface device of the first communication device. For example, in an embodiment, the AL 112 determines that another communication interface (e.g., the interface device 108) of the device 100 cannot relay the message. As illustrative examples, in various embodiments and/or scenarios, the AL 112 determines that no other communication interface of the device 100 is available to relay the message, that no other communication interface of the device 100 is capable of relaying the message to the device addressed in the message, etc. Determining that no other communication interface of the device 100 is capable of relaying the message to the device addressed in the message comprises analyzing a destination address in the message (communicated to the AL 112 by the DLL 120) and determining that no other communication interface of the device 100 is capable of relaying the message to the addressed device, in an embodiment.

At block 612, the AL passes to the first communication interface device an indication that the AL rejects the message. For example, the AL 112 passes to the DLL 120 an indication that the AL 112 rejects the message. In some embodiments, block 612 is included in block 604, and the indication that the AL rejects the message is one of the control messages 132 exchanged between the DLL 120 and the AL 112. In other embodiments, block 612 is separate from the block 604.

Figure 7:
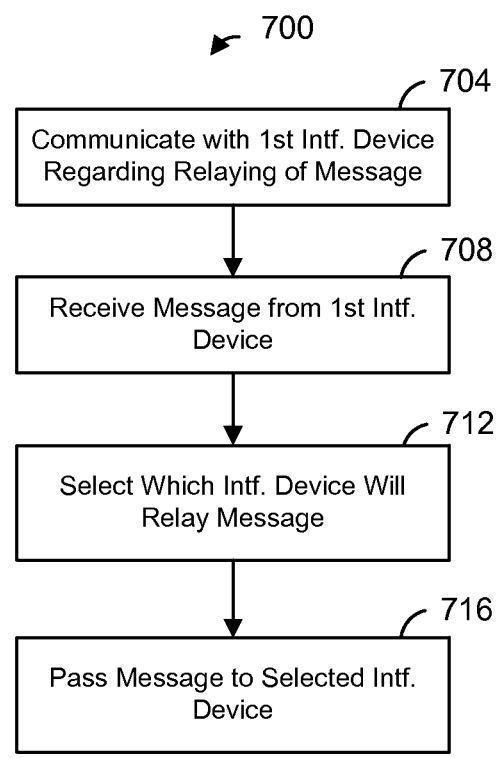
FIG. 7 is a flow diagram of another example method for processing messages in a heterogeneous communication network, according to an embodiment.

FIG. 7 is a flow diagram of an example method 700 that is implemented by a processor of a communication device, according to an embodiment. In various embodiments, the method 700 is implemented by the processor 28 (FIG. 1) or another suitable processor. Merely for illustrative purposes, the method 700 is discussed (i) with reference to FIGS. 2B and 2C, and (ii) in the context of the method 700 being implemented by the processor 28. In an embodiment, the processor implements an AL, and the method 700 is discussed in the context of the AL 112 implementing the method 700 merely for illustrative purposes.

At block 704, the AL communicates with a first communication interface device of the first communication device regarding relaying a message received by the first communication interface device via a first communication media type. For example, the AL 112 communicates with the DLL 120 regarding relaying of the message received by the interface device 104 via the powerline media, in an embodiment. For example, the AL 112 exchanges one or more control messages 132 with the DLL 120, in an embodiment. In an embodiment, the DLL 120 notifies the AL 112 that the DLL 120 received the message, which is addressed to another device (e.g., a second communication device).

In an embodiment, the first communication interface device is configured to communicate over a first communication media type according to (i) a first layer (e.g., the PHY 116) in a protocol stack of a communication protocol, and (ii) a second layer (e.g., the DLL 120) in the protocol stack, in an embodiment. The first communication interface device is also configured to relay messages between two or more other communication devices in (i) via the first communication media type, and (ii) using relaying functionality specified by the second layer (e.g., the DLL 120) of the communication protocol, in an embodiment.

At block 708, the AL receives the message from the first communication interface device. For example, in an embodiment, the AL 112 receives the message from the interface device 108.

At block 712, the AL selects which communication interface device of the first communication device will relay the message. For example, in an embodiment, the AL 112 determines which communication interface device (e.g., the interface device 104 or the interface device 108) of the device 100 can better relay the message. As illustrative examples, in various embodiments and/or scenarios, the AL 112 communicates with the interface device 104 and the interface device 108 to determine one or more of current processing loads, throughput rates, latencies, signal to noise ratios, error rates, etc., associated with the different communication interfaces 104, 108, and chooses one of the communication interfaces based on one or more of current processing loads, throughput rates, latencies, signal to noise ratios, error rates, etc., in various embodiments. In other embodiments, other suitable criteria for selecting which communication interface device will relay the message are utilized.

At block 716, the AL passes to the selected communication interface device the message. For example, if the interface device 108 is selected, the AL 112 passes the message to the MAC layer 128, in an embodiment. As another example, if the interface device 104 is selected, the AL 112 passes the message back to the DLL 120, in an embodiment. In some embodiments, the AL passes one or more instructions to the selected communication interface device to relay the message.

In some embodiments, when an interface device other than the first communication interface device is selected at block 712, the AL passes to the first communication interface device an indication that another communication interface device (e.g., the communication interface device 108) will relay the message. For example, when the interface device 108 is selected at block 712, the AL 112 passes to the DLL 120 an indication that another communication interface device will relay the message. In some embodiments, passing of such an indication is included in block 704, and the indication that another communication interface device will relay the message is one of the control messages 132 exchanged between the DLL 120 and the AL 112. In other embodiments, passing of such an indication is separate from the block 704. In some embodiments, passing of such an indication is omitted.

In some embodiments, the methods 600 and 700 are combined in a suitable manner. For example, in an embodiment, if it is determined at block 608 that another interface device cannot relay the message, blocks 708, 712, and 716 are not performed. On the other hand, if it is determined that another interface device can relay the message, block 612 is not performed, in an embodiment. The methods 600 and 700 are combined other suitable ways in other embodiments.

In one embodiment, a method is for processing messages in a heterogeneous network, the heterogeneous network including a plurality of disparate communication media types. The method includes receiving, at a first communication interface device of a first communication device, a message addressed to a second communication device. The first communication interface device is configured to communicate over a first communication media type according to (i) a first layer in a protocol stack of a communication protocol, and (ii) a second layer in the protocol stack, and the first communication interface device is configured to relay messages between two or more other communication devices in the heterogeneous network (i) via the first communication media type, and (ii) using relaying functionality specified by the second layer of the communication protocol. The method also includes communicating, using the first communication interface device, between the second layer of the communication protocol and an abstraction layer (AL) regarding relaying of the message, wherein the AL is configured to abstract the first layer and the second layer from an upper layer in the protocol stack. The method additionally includes at least one of: (i) if the AL rejects the message, relaying, with the first communication device, the message via the first communication media type using the relaying functionality specified by the second layer of the communication protocol, or (ii) when the AL instructs the second layer to relay the message, relaying, with the first communication device, the message via the first communication media type using the relaying functionality specified by the second layer of the communication protocol.

In various other embodiments, the method includes any combination of one or more of the following features.

The method further includes forwarding, with the first communication interface device, the message to the AL.

Forwarding the message to the AL is so that the message is relayed to the second communication device via a second communication interface device configured to communicate via a second communication media type if the AL does not instruct the second layer to relay the message.

The first layer and the second layer in the protocol stack correspond to (i) International Telecommunications Union Telecommunication Standardization Sector (ITU-T) Recommendation G.9960, and (ii) ITU-T Recommendation G.9961, respectively.

The first communication media type is one of (i) power line, (ii) coaxial cable, (iii) plastic optical fiber, or (iii) copper pair cabling.

In another embodiment, an apparatus is for communicating in a heterogeneous network, the heterogeneous network including a plurality of disparate communication media types. The apparatus comprises a first communication interface configured to communicate over a first communication media type according to (i) a first layer in a protocol stack of a communication protocol, and (ii) a second layer in the protocol stack, relay messages between two or more other communication devices in the heterogeneous network (i) via the first communication media type, and (ii) using relaying functionality specified by the second layer of the communication protocol, communicate between the second layer of the communication protocol and an abstraction layer (AL) regarding relaying of the message, wherein the AL is configured to abstract the first layer and the second layer from an upper layer in the protocol stack. Additionally, the first communication interface is configured to, at least one of: (i) if the AL rejects the message, relay the message via the first communication media type using the relaying functionality specified by the second layer of the communication protocol, or (ii) when the AL instructs the second layer to relay the message, relay the message via the first communication media type using the relaying functionality specified by the second layer of the communication protocol.

In various other embodiments, the apparatus includes any combination of one or more of the following features.

The first communication interface is configured to forward the message to the AL.

The first communication interface is configured to forward the message to the AL is so that the message is relayed to the second communication device via a second communication interface device configured to communicate via a second communication media type if the AL does not instruct the second layer to relay the message.

The first communication interface is configured to implement the first layer and the second layer in the protocol stack according, at least partially, to (i) International Telecommunications Union Telecommunication Standardization Sector (ITU-T) Recommendation G.9960, and (ii) ITU-T Recommendation G.9961, respectively.

The first communication media type is one of (i) power line, (ii) coaxial cable, (iii) plastic optical fiber, or (iii) copper pair cabling.

In yet another embodiment, a method is for processing messages in a heterogeneous network, the heterogeneous network including a plurality of disparate communication media types, wherein a protocol stack of a communication protocol is associated with a first communication media type, wherein the protocol stack includes (i) a first layer, and (ii) a second layer. The method includes communicating, using a processor of a first communication device, between an abstraction layer (AL) and the second layer of the communication protocol regarding relaying of a message received at a first communication interface device of the first communication device, wherein the message is addressed to a second communication device, the first communication interface device is configured to relay messages between two or more other communication devices in the heterogeneous network (i) via the first communication media type, and (ii) using relaying functionality specified by the second layer of the communication protocol, and the AL is configured to abstract the first layer and the second layer from an upper layer in the protocol stack. The method also includes determining at the AL, using the processor, whether the message should be relayed by another communication interface associated with another media type. The method additionally includes at least one of: (i) when the AL determines that the message should be relayed by another communication interface associated with another media type, forwarding from the AL, using the processor, the message to a second communication interface device associated with a second communication media type, and (ii) wherein, when the AL determines that the message should be relayed by the first communication interface device, communicating between the AL and the second layer of the communication protocol regarding relaying of the message includes at least one of: (a) communicating to the second layer, using the processor, a rejection by the AL of the message, or (b) instructing the second layer, using the processor, to relay the message using the relaying functionality specified by the second layer.

In various other embodiments, the method includes any combination of one or more of the following features.

Determining at the AL whether the message should be relayed by another communication interface associated with another media type comprises determining at the AL, using the processor, whether the message can be relayed by another communication interface associated with another media type.

The method further comprises receiving at the AL, using the processor, the message from the second layer.

The first layer and the second layer in the protocol stack correspond to (i) International Telecommunications Union Telecommunication Standardization Sector (ITU-T) Recommendation G.9960, and (ii) ITU-T Recommendation G.9961, respectively.

The first communication media type is one of (i) power line, (ii) coaxial cable, (iii) plastic optical fiber, or (iii) copper pair cabling.

In still another embodiment, an apparatus is for processing messages in a heterogeneous network, the heterogeneous network including a plurality of disparate communication media types, wherein a protocol stack of a communication protocol is associated with a first communication media type, wherein the protocol stack includes (i) a first layer, and (ii) a second layer. The apparatus comprises a processor configured to implement an abstraction layer (AL), communicate between the abstraction layer (AL) and the second layer of the communication protocol regarding relaying of a message received at a first communication interface device of a first communication device, wherein the message is addressed to a second communication device, the first communication interface device is configured to relay messages between two or more other communication devices in the heterogeneous network (i) via the first communication media type, and (ii) using relaying functionality specified by the second layer of the communication protocol, and the AL is configured to abstract the first layer and the second layer from an upper layer in the protocol stack. The processor is further configured to determine, at the AL, whether the message should be relayed by another communication interface associated with another media type; and at least one of: (i) when the AL determines that the message should be relayed by another communication interface associated with another media type, forward from the AL the message to a second communication interface device associated with a second communication media type, and (ii) wherein, when the AL determines that the message should be relayed by the first communication interface device, communicating between the AL and the second layer of the communication protocol regarding relaying of the message includes at least one of: (a) communicating to the second layer a rejection by the AL of the message, or (b) instructing the second layer to relay the message using the relaying functionality specified by the second layer.

In various other embodiments, the apparatus includes any combination of one or more of the following features.

The processor is configured to determine at the AL whether the message can be relayed by another communication interface associated with another media type.

The processor is configured to receive, at the AL, the message from the second layer.

The first communication interface device is configured to implement the first layer and the second layer in the protocol stack according, at least partially, to (i) International Telecommunications Union Telecommunication Standardization Sector (ITU-T) Recommendation G.9960, and (ii) ITU-T Recommendation G.9961, respectively.

The apparatus further comprises the first communication interface device.

The apparatus further comprises a second communication interface device coupled to a second media type.

The first communication media type is one of (i) power line, (ii) coaxial cable, (iii) plastic optical fiber, or (iii) copper pair cabling.

As described, the various techniques described above may be implemented using hardware, firmware instructions executed by a processor, software instructions executed by a processor, or a combination of hardware, firmware instructions executed by a processor, and/or software instructions executed by a processor. When implemented using software instructions executed by a processor, the software instructions may be stored in any tangible, non-transitory computer readable medium or media such as on a magnetic disk, an optical disk, in a random access memory (RAM), a read only memory (ROM), a flash memory, of or associated with a computer, processor, integrated circuit, hard disk drive, optical disk drive, tape drive, etc. When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method of processing messages in a heterogeneous network, the heterogeneous network including a plurality of disparate communication media types, the method comprising:
receiving, at a first communication interface device of a first communication device, a message addressed to a second communication device, wherein
the first communication interface device is configured to communicate over a first communication media type according to (i) a first layer in a protocol stack of a communication protocol, and (ii) a second layer in the protocol stack, and
the first communication interface device is configured to relay messages between two or more other communication devices in the heterogeneous network (i) via the first communication media type, and (ii) using relaying functionality specified by the second layer of the communication protocol;
communicating, using the first communication interface device, between the second layer of the communication protocol and an abstraction layer (AL) regarding relaying of the message, wherein the AL is configured to abstract the first layer and the second layer from an upper layer in the protocol stack; and
at least one of:
(i) if the AL rejects the message, relaying, with the first communication device, the message via the first communication media type using the relaying functionality specified by the second layer of the communication protocol, or
(ii) when the AL instructs the second layer to relay the message, relaying, with the first communication device, the message via the first communication media type using the relaying functionality specified by the second layer of the communication protocol.

2. The method of claim 1, further comprising forwarding, with the first communication interface device, the message to the AL.

3. The method of claim 2, wherein forwarding the message to the AL is so that the message is relayed to the second communication device via a second communication interface device configured to communicate via a second communication media type if the AL does not instruct the second layer to relay the message.

4. The method of claim 1, wherein the first layer and the second layer in the protocol stack correspond to (i) International Telecommunications Union Telecommunication Standardization Sector (ITU-T) Recommendation G.9960, and (ii) ITU-T Recommendation G.9961, respectively.

5. The method of claim 1, wherein the first communication media type is one of (i) power line, (ii) coaxial cable, (iii) plastic optical fiber, or (iii) copper pair cabling.

6. An apparatus for communicating in a heterogeneous network, the heterogeneous network including a plurality of disparate communication media types, the apparatus comprising:
a first communication interface configured to
communicate over a first communication media type according to (i) a first layer in a protocol stack of a communication protocol, and (ii) a second layer in the protocol stack,
relay messages between two or more other communication devices in the heterogeneous network (i) via the first communication media type, and (ii) using relaying functionality specified by the second layer of the communication protocol,
communicate between the second layer of the communication protocol and an abstraction layer (AL) regarding relaying of the message, wherein the AL is configured to abstract the first layer and the second layer from an upper layer in the protocol stack, and
at least one of:
(i) if the AL rejects the message, relay the message via the first communication media type using the relaying functionality specified by the second layer of the communication protocol, or
(ii) when the AL instructs the second layer to relay the message, relay the message via the first communication media type using the relaying functionality specified by the second layer of the communication protocol.

7. The apparatus of claim 6, wherein the first communication interface is configured to forward the message to the AL.

8. The apparatus of claim 7, wherein the first communication interface is configured to forward the message to the AL is so that the message is relayed to the second communication device via a second communication interface device configured to communicate via a second communication media type if the AL does not instruct the second layer to relay the message.

9. The apparatus of claim 6, wherein the first communication interface is configured to implement the first layer and the second layer in the protocol stack according, at least partially, to (i) International Telecommunications Union Telecommunication Standardization Sector (ITU-T) Recommendation G.9960, and (ii) ITU-T Recommendation G.9961, respectively.

10. The apparatus of claim 6, wherein the first communication media type is one of (i) power line, (ii) coaxial cable, (iii) plastic optical fiber, or (iii) copper pair cabling.

11. A method of processing messages in a heterogeneous network, the heterogeneous network including a plurality of disparate communication media types, wherein a protocol stack of a communication protocol is associated with a first communication media type, wherein the protocol stack includes (i) a first layer, and (ii) a second layer, the method comprising:
communicating, using a processor of a first communication device, between an abstraction layer (AL) and the second layer of the communication protocol regarding relaying of a message received at a first communication interface device of the first communication device, wherein
the message is addressed to a second communication device,
the first communication interface device is configured to relay messages between two or more other communication devices in the heterogeneous network (i) via the first communication media type, and (ii) using relaying functionality specified by the second layer of the communication protocol, and
the AL is configured to abstract the first layer and the second layer from an upper layer in the protocol stack;
determining at the AL, using the processor, whether the message should be relayed by another communication interface associated with another media type; and
at least one of:
(i) when the AL determines that the message should be relayed by another communication interface associated with another media type, forwarding from the AL, using the processor, the message to a second communication interface device associated with a second communication media type, and (ii) wherein, when the AL determines that the message should be relayed by the first communication interface device, communicating between the AL and the second layer of the communication protocol regarding relaying of the message includes at least one of:
(a) communicating to the second layer, using the processor, a rejection by the AL of the message, or
(b) instructing the second layer, using the processor, to relay the message using the relaying functionality specified by the second layer.

12. The method of claim 11, wherein determining at the AL whether the message should be relayed by another communication interface associated with another media type comprises determining at the AL, using the processor, whether the message can be relayed by another communication interface associated with another media type.

13. The method of claim 11, further comprising receiving at the AL, using the processor, the message from the second layer.

14. The method of claim 11, wherein the first layer and the second layer in the protocol stack correspond to (i) International Telecommunications Union Telecommunication Standardization Sector (ITU-T) Recommendation G.9960, and (ii) ITU-T Recommendation G.9961, respectively.

15. The method of claim 11, wherein the first communication media type is one of (i) power line, (ii) coaxial cable, (iii) plastic optical fiber, or (iii) copper pair cabling.

16. An apparatus for processing messages in a heterogeneous network, the heterogeneous network including a plurality of disparate communication media types, wherein a protocol stack of a communication protocol is associated with a first communication media type, wherein the protocol stack includes (i) a first layer, and (ii) a second layer, the apparatus comprising:
a processor configured to
implement an abstraction layer (AL),
communicate between the abstraction layer (AL) and the second layer of the communication protocol regarding relaying of a message received at a first communication interface device of a first communication device, wherein
the message is addressed to a second communication device,
the first communication interface device is configured to relay messages between two or more other communication devices in the heterogeneous network (i) via the first communication media type, and (ii) using relaying functionality specified by the second layer of the communication protocol, and
the AL is configured to abstract the first layer and the second layer from an upper layer in the protocol stack;
wherein the processor is further configured to
determine, at the AL, whether the message should be relayed by another communication interface associated with another media type; and
at least one of:
(i) when the AL determines that the message should be relayed by another communication interface associated with another media type, forward from the AL the message to a second communication interface device associated with a second communication media type, and
(ii) wherein, when the AL determines that the message should be relayed by the first communication interface device, communicating between the AL and the second layer of the communication protocol regarding relaying of the message includes at least one of:
(a) communicating to the second layer a rejection by the AL of the message, or
(b) instructing the second layer to relay the message using the relaying functionality specified by the second layer.

17. The apparatus of claim 16, wherein the processor is configured to determine at the AL whether the message can be relayed by another communication interface associated with another media type.

18. The apparatus of claim 16, wherein the processor is configured to receive, at the AL, the message from the second layer.

19. The apparatus of claim 16, wherein the first communication interface device is configured to implement the first layer and the second layer in the protocol stack according, at least partially, to (i) International Telecommunications Union Telecommunication Standardization Sector (ITU-T) Recommendation G.9960, and (ii) ITU-T Recommendation G.9961, respectively.

20. The apparatus of claim 16, further comprising the first communication interface device.

21. The apparatus of claim 16, further comprising a second communication interface device coupled to a second media type.

22. The method of claim 16, wherein the first communication media type is one of (i) power line, (ii) coaxial cable, (iii) plastic optical fiber, or (iii) copper pair cabling.

* * * * *